United States Patent [19]
Yukawa et al.

[11] Patent Number: 5,623,824
[45] Date of Patent: Apr. 29, 1997

[54] AIR-FUEL RATIO CONTROL SYSTEM FOR INTERNAL COMBUSTION ENGINE

[75] Inventors: Fumio Yukawa; Tsutomu Kikuchi, both of Kanagawa, Japan

[73] Assignee: Nissan Motor Co., Ltd., Yokohama, Japan

[21] Appl. No.: 198,395

[22] Filed: Feb. 18, 1994

Related U.S. Application Data

[63] Continuation of Ser. No. 858,012, Mar. 26, 1992, abandoned.

[30] Foreign Application Priority Data

Jun. 26, 1991 [JP] Japan .................. 3-154949

[51] Int. Cl.$^6$ .......................................... F01N 3/28
[52] U.S. Cl. ............................... 60/276; 60/285
[58] Field of Search .................. 60/274, 276, 285

[56] References Cited

U.S. PATENT DOCUMENTS

| | | | |
|---|---|---|---|
| 4,402,291 | 9/1983 | Aono | 123/687 |
| 4,475,512 | 10/1984 | Suzuki | 60/276 |
| 4,912,926 | 4/1990 | Kumagai | 60/276 |
| 5,052,177 | 10/1991 | Nada | 60/276 |
| 5,099,818 | 3/1992 | Takahashi | 123/679 |
| 5,103,640 | 4/1992 | Nada | 60/285 |

FOREIGN PATENT DOCUMENTS 2-30915  2/1990  Japan.

*Primary Examiner*—Douglas Hart
*Attorney, Agent, or Firm*—Foley & Lardner

[57] ABSTRACT

An air-fuel ratio control system for an automotive internal combustion engine provided with a three-way catalytic converter disposed in an exhaust gas passageway of the engine. The air-fuel ratio control system is comprised of an oxygen sensor disposed in the exhaust gas passageway downstream of the catalytic converter. The air-fuel ratio of air-fuel mixture to be supplied to the engine is controlled toward a stoichiometric value to cause the three-way catalytic converter to efficiently work under the action of a control unit including a microcomputer. In the control unit, a control constant is set in accordance with the output voltage of the oxygen sensor, and a cycle signal (pulse signal) is cyclically generated. The control constant is compulsorily minutely vibrated under the action of the cycle signal, thereby obtaining an air-fuel ratio correction coefficient. The amount of fuel to be supplied to the engine is calculated in accordance with the air-fuel ratio correction coefficient and injected from a fuel injector valve.

16 Claims, 4 Drawing Sheets

AIR-FUEL RATIO CONTROL SYSTEM FOR INTERNAL COMBUSTION ENGINE

This application is a continuation of application Ser. No. 07/858,012, filed Mar. 26, 1992, abandoned.

BACKGROUND OF THE INVENTION

1. Field of the Invention

This invention relates to an air-fuel ratio control system for an internal combustion engine provided with a catalytic converter, and more particularly to the system including only one oxygen sensor disposed downstream of the catalytic converter to accomplish a feedback control of air-fuel ratio of air-fuel mixture to be supplied to the engine.

2. Description of the Prior Art

A variety of computer-controlled air-fuel ratio control systems for an automotive internal combustion engines have been proposed and put into practical use. Of these, there is one in which first and second oxygen sensors are disposed respectively on the upstream and downstream sides of a catalytic converter to sense oxygen concentrations in exhaust gas. According to the thus sensed oxygen concentration, an air-fuel ratio of air-fuel mixture supplied to the engine is detected.

In accordance with the air-fuel ratio detected under the action of the first oxygen sensor, an air-fuel ratio correction coefficient is set to control the air-fuel ratio at a target air-fuel ratio (stoichiometric air-fuel ratio). The amount of fuel injected from a fuel injector valve to the engine is calculated in accordance with the air-fuel ratio correction coefficient. Additionally, a correction of shift amount of the air-fuel ratio is made in accordance with the air-fuel ratio detected under the action of the second oxygen sensor, thus setting the air-fuel ratio at an optimum value. Such a conventional air-fuel ratio control system is disclosed in Japanese Patent Provisional Publication No. 2-30915.

However, drawbacks have been encountered in the above-discussed conventional air-fuel ratio control system. That is to say, the conventional air-fuel ratio control system includes two oxygen sensors which are disposed respectively on the upstream and downstream sides of the catalytic converter, and therefore the air-fuel ratio control system is complicated not only in structure but also in control manner thereof, while increasing a production cost thereof. Additionally, the oxygen sensor disposed upstream of the catalytic converter is subjected to a high temperature due to exhaust gas heat. Accordingly, the oxygen sensor tends to thermally deteriorate to, for example, prolong a control cycle for the air-fuel ratio of the mixture to be supplied to the engine. This makes it difficult to put the air-fuel ratio of the mixture into the stoichiometric value, thereby degrading the character of exhaust gas discharged through the catalytic converter.

SUMMARY OF THE INVENTION

An object of the present invention is to provide an improved air-fuel ratio control system for an internal combustion engine provided with a catalytic converter, which is low in production cost, improving an exhaust gas purifying efficiency of the catalytic converter.

Another object of the present invention is to provide an improved air-fuel ratio control system for an internal combustion engine provided with a catalytic converter, which can maintain the air-fuel ratio of a mixture to be supplied to the engine into a target level suitable for allowing the catalytic converter to effectively work even though only one sensor for detecting the concentration of an exhaust gas component is disposed downstream of the catalytic converter.

An air-fuel ratio control system of the present invention is for an internal combustion engine provided with a catalytic converter disposed in an exhaust gas passageway of the engine. The air-fuel ratio control system is comprised of first means for detecting the air-fuel ratio of the air-fuel mixture supplied to the engine, by sensing a component of exhaust gas in the exhaust gas passageway downstream of the catalytic converter. Second means is provided to set an air-fuel ratio correction amount in accordance with the detected air-fuel ratio, to control the air-fuel ratio toward a target air-fuel ratio. Third means is provided to set a cycle correction amount in accordance with the engine operating condition. The cycle correction amount is capable of changing at least one of a cycle and an amplitude of variation of the air-fuel ratio correction amount. Fourth means is provided to set a fuel supply amount in accordance with the air-fuel ratio correction amount and the cycle correction amount. Fifth means is provided to supply a fuel into the engine. Additionally, sixth means is provided to control an amount of the fuel to be supplied from the fuel supply means, in accordance with the fuel supply amount.

Accordingly, only one exhaust gas sensor is required to be disposed downstream of the catalytic converter to detect the air-fuel ratio of the mixture supplied to the engine, and therefore the production cost and control manner of the air-fuel ratio control system is simplified, while preventing the exhaust gas sensor from its thermal deterioration thereby to avoid lowering the exhaust gas purifying efficiency of the catalytic converter. Additionally, the air-fuel ratio of the mixture can be maintained around a target value to cause the catalytic converter to effectively work thereby to complete exhaust gas purification even though only one exhaust gas sensor is disposed downstream of the catalytic converter.

DETAILED DESCRIPTION OF THE INVENTION

Figure 1:
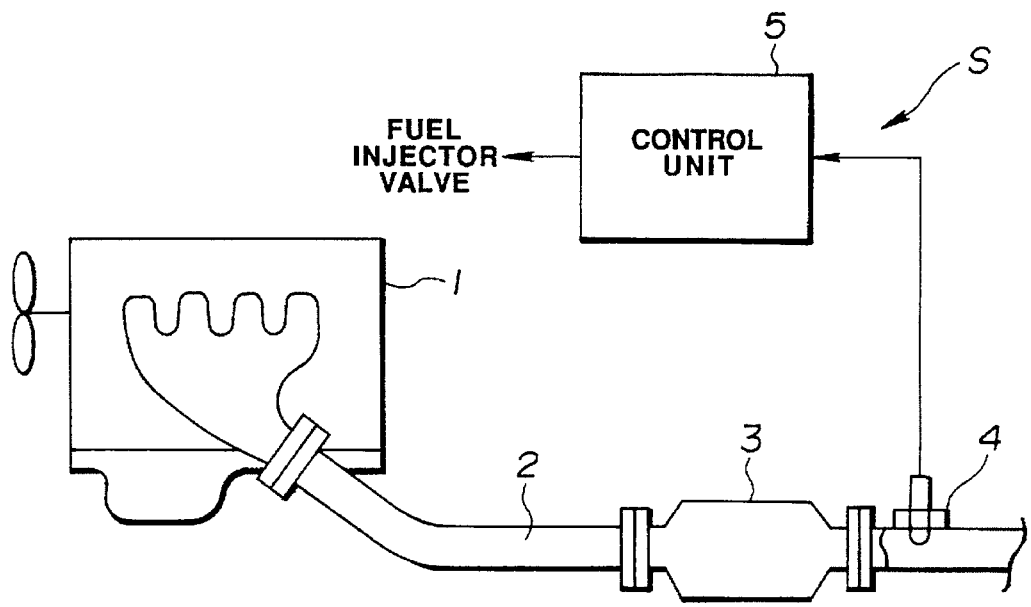
FIG. 1 is a schematic illustration of an automotive internal combustion engine provided with an embodiment of an air-fuel ratio control system according to the present invention.

Referring now to FIG. 1, a preferred embodiment of an air-fuel ratio control system S according to the present invention is incorporated with an internal combustion engine 1 which is for an automotive vehicle in this embodiment. The engine 1 is provided with an exhaust gas passageway 2 through which exhaust gas from the engine 1 is discharged to ambient air. A catalytic converter 3 is disposed in the exhaust gas passageway 2 to convert the harmful components in exhaust gas into the harmless components. The catalytic converter 3 in this embodiment is a three-way catalytic converter which is adapted to simultaneously convert CO, NOx and HC (hydrocarbons) into harmless components. The three-way catalytic converter efficiently works upon supply of stoichiometric air-fuel mixture to the engine as is well known.

An oxygen sensor 4 is disposed in the exhaust gas passageway 2 downstream of the catalytic converter 3. The oxygen sensor 4 is adapted to sense the oxygen concentration in exhaust gas and outputs an electrical signal representative of the oxygen concentration, to a control unit 5 including a microcomputer and the like. The control unit 5 calculates a fuel injection amount Ti in accordance with the output signal from the oxygen sensor and other signals from a variety oil sensors. The fuel injection amount is the amount of fuel to be injected from a fuel injector valve which is disposed to supply fuel into the engine 1. The fuel injector valve is arranged to open to inject fuel in accordance with the pulse width of a pulse signal (corresponding to the fuel injection amount Ti) output from the control unit 5.

The control unit 5 is further supplied with an intake air flow amount signal, an engine speed signal and a coolant temperature signal, though not shown. The intake air flow amount signal is representative of an intake air flow amount or the flow amount of intake air to be inducted into the engine 1 and output from an air flow meter or sensor (not shown). The engine speed signal is representative of an engine speed of the engine 1 and output from an engine speed sensor (not shown). The coolant temperature signal is representative of an engine coolant temperature or the temperature of an engine coolant and output from an engine coolant temperature sensor(not shown).

Figure 2:
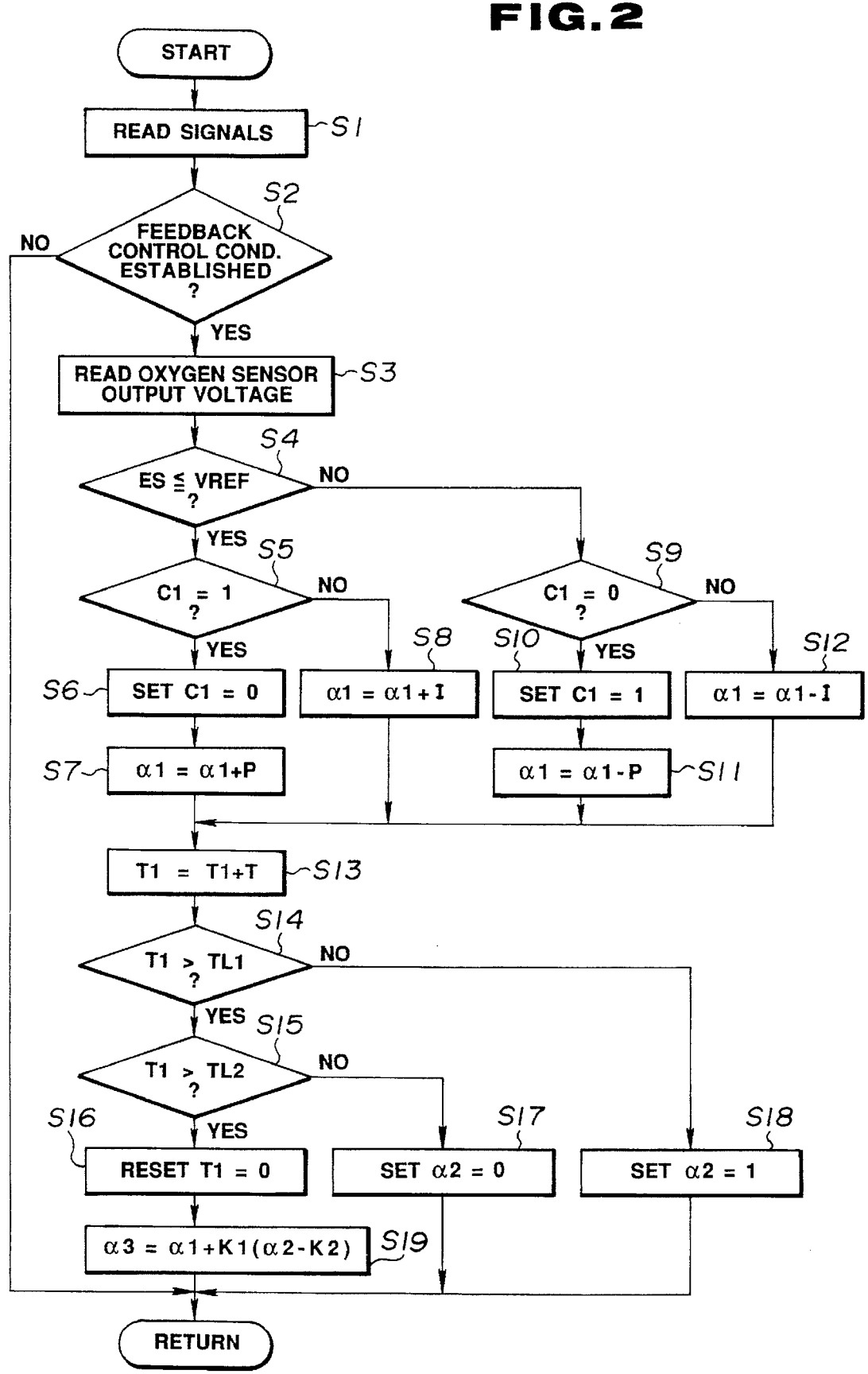
FIG. 2 is a flowchart showing a control routine of the air-fuel ratio control system of FIG. 1.

The manner of operation of the air-fuel ratio control system S will be discussed with reference to a flowchart of FIG. 2 and graphs of FIG. 3. The routine of this flowchart is for setting an air-fuel ratio correction coefficient $\alpha 3$ and executed at intervals of a predetermined crank angle of the engine 1. The routine is carried out by the control unit 5.

At a step S1, a variety of signals from the air flow meter and the like are read. At a step S2, a judgment is made as to whether an air-fuel ratio feedback control condition is established or not, in accordance with the read signals. In case of YES, a flow goes to a step S3. In case of NO, the routine is terminated. In the air-fuel ratio feedback control condition, a feedback control of the air-fuel ratio of the air-fuel mixture to be supplied to the engine 1 is made in accordance with a voltage signal output from the oxygen sensor 4. At a step S3, an output voltage ES of the voltage signal of the oxygen sensor 4 is read upon being subjected to an analog-to-digital conversion. At a step S4, a judgment is made as to whether the read output voltage ES is not higher than a standard voltage VREF corresponding to a target air-fuel ratio (stoichiometric air-fuel ratio). In case of YES, the air-fuel ratio of air-fuel mixture supplied to the engine is judged to be lean (leaner or higher than the stoichiometric air-fuel ratio), and therefore the flow goes to a step S5. In case of NO, the air-fuel ratio is judged to be rich (richer or lower than the stoichiometric air-fuel ratio), and therefore the flow goes to a step S9.

At a step S5, a judgement is made as to whether a flag C1 which has been set at the immediately preceding routine is 1 or not. In case of YES, the air-fuel ratio is changed from a rich state to a lean state, and therefore the flow goes to a step S6. In case of NO, the air-fuel ratio is unchanged and has been kept at the lean state from the immediately preceding routine, and therefore the flow goes to a step S8. Here, the air-fuel ratio of the mixture is in the rich state when the flag C1=1, whereas the air-fuel ratio is in the lean state when the flag C1=0.

At a step S6, the flag C1 is set at 0, and thereafter the flow goes to a step S7. At the step S7, a proportional amount P is added to a control constant $\alpha 1$ in the immediately preceding routine to set a new control constant $\alpha 1$ (=$\alpha 1$+P) as a new air-fuel ratio correction amount in order to rapidly enrich the air-fuel ratio of the mixture. According to the air-fuel ratio correction amount (control constant), the air-fuel ratio of the mixture to be supplied to the engine 1 is controlled toward the stoichiometric value.

When the air-fuel ratio is judged to be at the lean state also in the immediately preceding routine at the step S5, an integrated amount I is added to the control constant $\alpha 1$ in the immediately preceding routine to set a new control constant $\alpha 1$ (=$\alpha 1$+I) in order to gradually enrich the air-fuel ratio of the mixture.

When the air-fuel ratio is judged to be in the rich state at the step S4, a judgment is made as to whether the flag C1 set in the immediately preceding routine is 0 or not at a step S9. In case of YES, the air-fuel ratio is judged to have been changed from the lean state to the rich state, so that the flow goes to a step S10. In case of NO, the air-fuel ratio is judged as having been kept at the rich state, so that the flow goes to the step S12. At the step S10, the flag C1 is set at 0, and then the flow goes to a step S11. At the step S11, the proportional amount P is subtracted from the control constant $\alpha 1$ in the immediately preceding routine to set a new control constant $\alpha 1$ (=$\alpha 1$−P) in order to rapidly make lean the air-fuel ratio.

When the air-fuel ratio is judged to be in the rich state in the immediately preceding routine at the step S9, the flow goes to a step S12 at which the integrated amount I is subtracted from the control constant $\alpha 1$ in the immediately preceding routine to set a new control constant $\alpha 1$ (=$\alpha 1$−I) in order to gradually make lean the air-fuel ratio.

Figure 3:
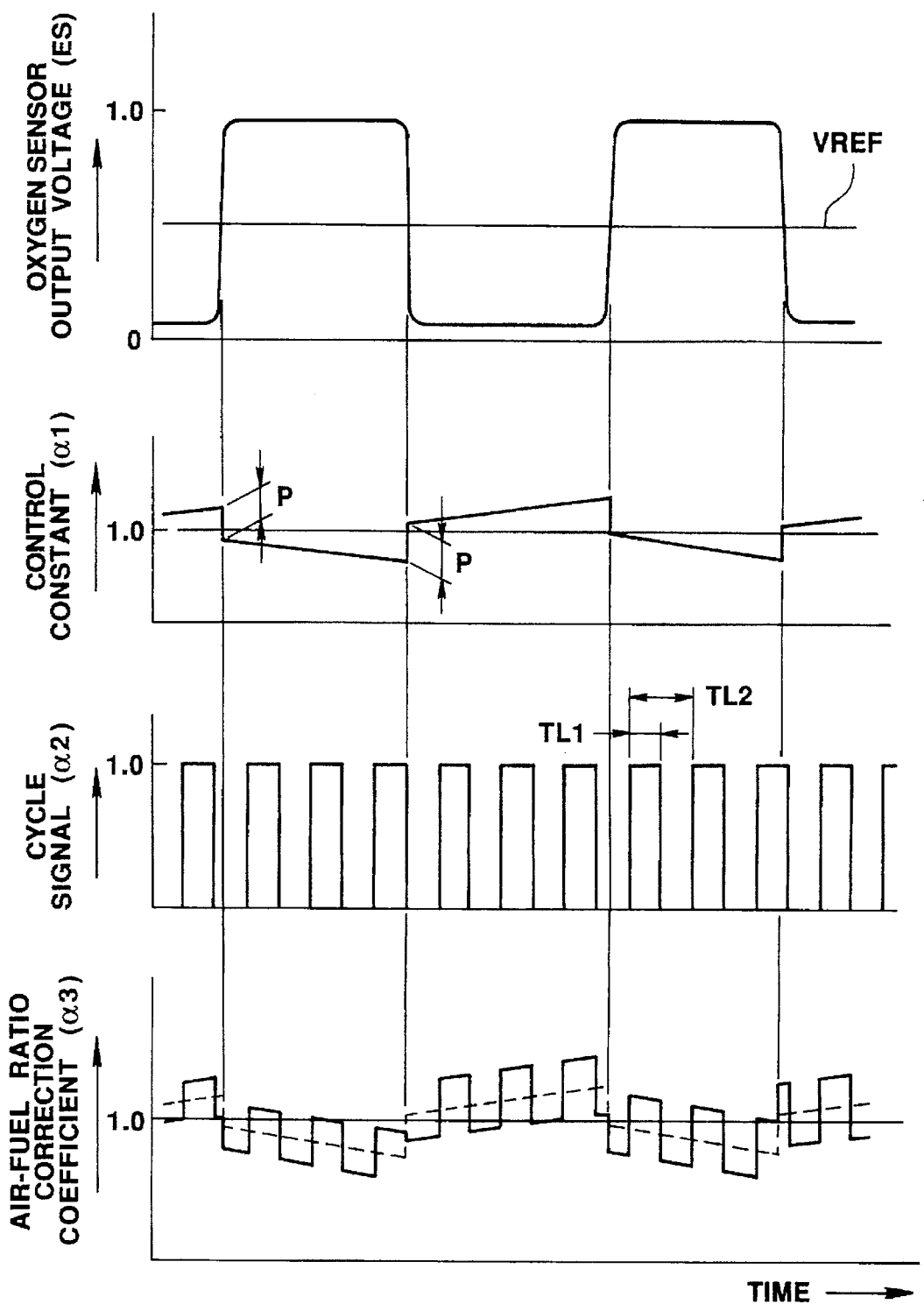
FIG. 3 are graphs illustrating the control operation of the air-fuel ratio control system of FIG. 1.

According to the above setting manner of the control constant $\alpha 1$, the control constant $\alpha 1$ is set as shown in FIG. 3 in which the control constant $\alpha 1$ rapidly changes by the proportional amount P and thereafter gradually changes.

At a step S13, a predetermined value T is added to a count value T1 in the immediately preceding routine to set a new count value T1 (=T1+T). A timer (not shown) is adapted to make a count every time when a cycle signal $\alpha 2$ shown in FIG. 3 is output. At a step S14, a judgment is made as to whether the count value T1 exceeds a first predetermined value TL1 or not, in which the flow goes to a step S15 in case of YES while to a step S18 in case of NO. At the step S15, a judgment is made as to whether the count value T1 of the timer exceeds a second predetermined value TL2, in which the flow goes to a step S16 in case of YES while to a step S17 in case of NO. Here, the first predetermined value TL1 represents an output time period (output time width) of the cycle signal $\alpha 2$, and the second predetermined value TL2 represents an output cycle (for example, 2 Hertz) for the cycle signal as shown in FIG. 3. In other words, the cycle signal $\alpha 2$ is a pulse signal having a predetermined constant pulse width (TL1) and a predetermined constant pulse interval (TL2). The first and second predetermined values TL1, TL2 are memorized in a map according to the engine speed, the intake air flow amount (engine load) and the coolant temperature. Accordingly, the first and second predetermined values TL1, TL2 are searched from the map in accordance with the engine operating condition and set. Otherwise, the first and second predetermined values TL1, TL2 may be set to meet the relationship of TL1=TL2/2=t1/Qa where t1 is a constant value; and Qa is a detected intake air flow amount) in order to always put a remaining amount of exhaust gas within the catalytic converter below a predetermined value, upon a basis that a reaction amount by a catalyst is approximately inversely proportional to the volume of exhaust gas at a predetermined amplitude of the air-fuel ratio of the mixture supplied to the engine. At a step S16, the count value T1 of the timer is set at an initial value (=0).

Figure 4:
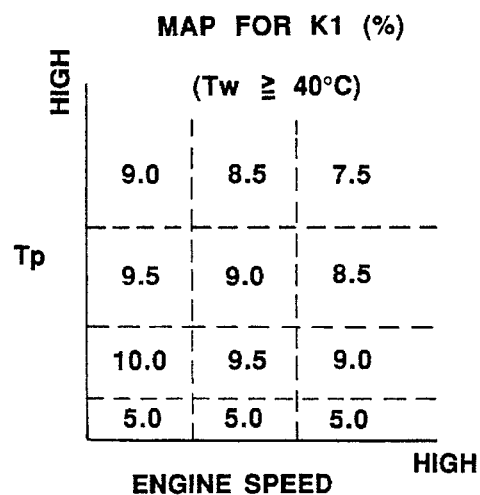
FIGS. 4, 5 and 6 are examples of maps from which control constants used in the control operation of FIG. 2 are determined.
Figure 5:
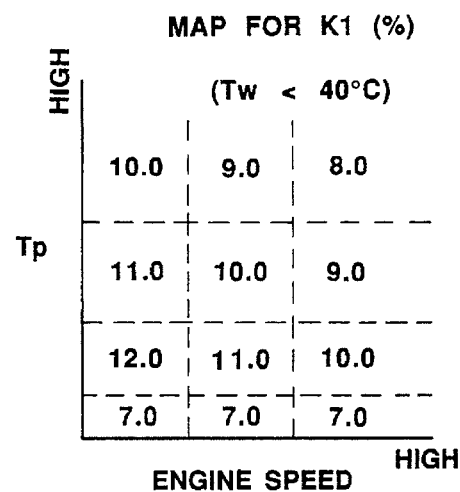
Figure 6:
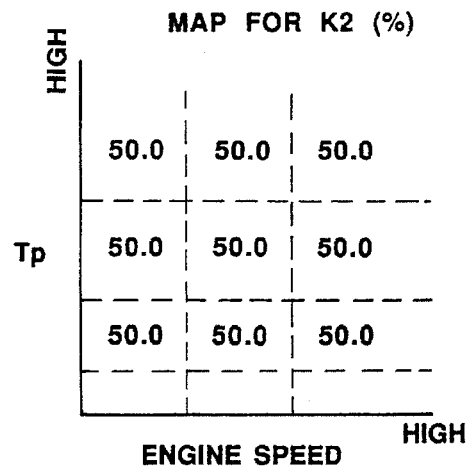

During a time period of TL1<T1≦TL2, the flow goes a step S17 at which the cycle signal α2 is set at 0. During a time period of 0≦T1≦TL1, the cycle signal α2 is set at 1. At a step S19, an air-fuel ratio correction coefficient α3 as shown in FIG. 3 is calculated in accordance with the control constant α1 and the cycle signal α2, according to the following equation:

$$\alpha 3 = \alpha 1 + K1 \, (\alpha 2 - K2)$$

where K1 is a constant; and K2 is a constant. The K1 is memorized in maps according to the engine speed, the intake air flow amount (=engine load) and the coolant temperature as shown in FIGS. 4 and 5, and therefore is searched from the map in accordance with the engine operating condition. In the maps, values of K1 are represented as percentages (%); Tw represents a coolant temperature; and Tp is a basic fuel injection amount (=engine load) which is obtained according to the equation of Tp=K×Qa/N where K is a constant; and N is an engine speed. It is to be noted that the K1 corresponds to the amplitude of small variation (corresponding to the cycle signal (α2)) of air-fuel ratio correction coefficient α3. The K2 is set at a constant value throughout the whole engine operating ranges or conditions as shown in a map of FIG. 6 in which the K2 is represented as a percentage (%). K2 may be set varying in accordance with engine operating conditions like K1.

Since the air-fuel ratio correction coefficient α3 is set as discussed above, it (α3) has a tendency to change largely corresponding to the change of the control constant α1 and to change minutely corresponding to the change of the cycle signal α2 as shown in FIG. 3. While the air-fuel ratio correction coefficient α3 has been shown and described as being changed in both cycle and amplitude of variation, it will be understood that it may be changed in at least one of the cycle and amplitude of variation in accordance with at least one of the cycle. (TL2) and the constant K1.

Upon using the air-fuel ratio correction coefficient α3 calculated as discussed above, the fuel injection amount Ti is calculated according to the following equation:

$$Ti = Tp \times \alpha 3 \times COEF + Ts$$

where Tp is the above-mentioned basic injection amount; COEF is a variety of correction coefficients mainly based on the coolant temperature; and Ts is a correction coefficient based on a battery voltage. The thus calculated fuel injection amount Ti is set as the pulse width of the pulse signal output from the control unit 5 to the fuel injector valve. Then, the fuel injector valve is operated to open in accordance with the pulse signal thereby to inject fuel in an amount corresponding to the fuel injection amount Ti. The thus injected fuel is supplied to the engine 1.

Figure 7:
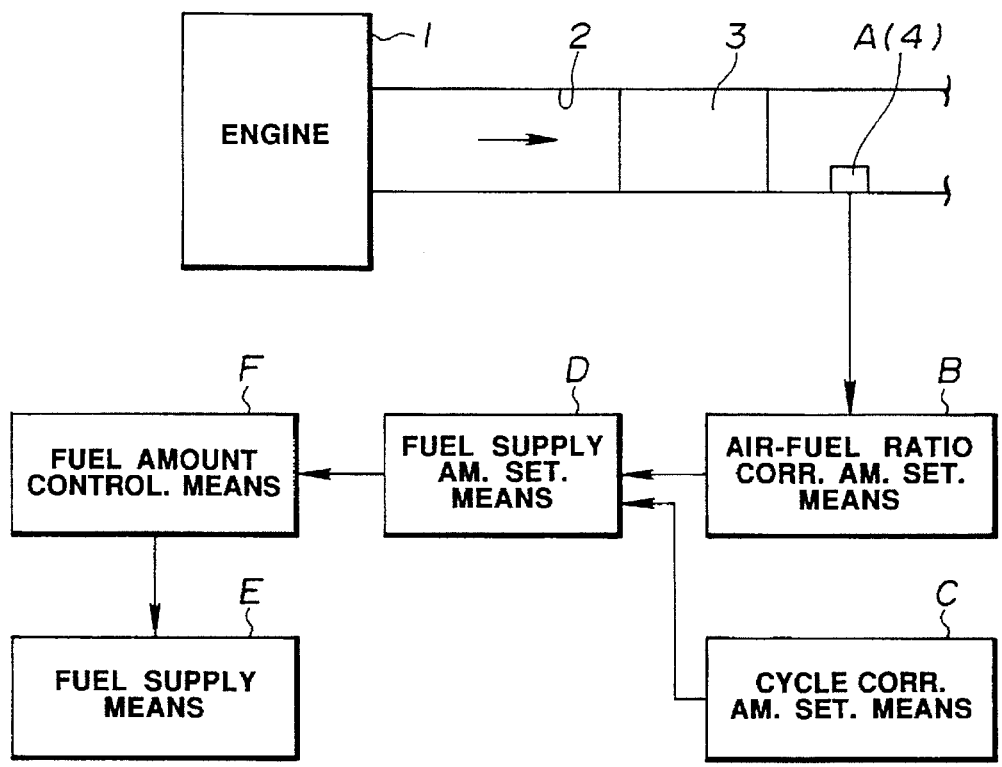
FIG. 7 is a block diagram showing the principle of the embodiment of the air-fuel ratio control system of FIG. 1.

FIG. 7 schematically shows the principle of the aspect of the air-fuel ratio control system of the above-discussed embodiment. The system S is incorporated with the internal combustion engine 1 which is provided with the exhaust gas passageway 2 in which a catalytic converter 3 is disposed. The system S is comprised of means A for detecting the air-fuel ratio of the air-fuel mixture supplied to the engine, by sensing a component of exhaust gas in the exhaust gas passageway downstream of the catalytic converter. Means B is provided to set an air-fuel ratio correction amount (corresponding to the control constant α1) in accordance with the detected air-fuel ratio, to control the air-fuel ratio toward a target air-fuel ratio. Means C is provided to set a cycle correction amount (corresponding to the cycle signal α2) in accordance with the engine operating condition. The cycle correction coefficient is capable of changing at least one of a cycle and an amplitude of variation of the air-fuel ratio correction amount. Means D is provided to set a fuel supply amount (corresponding to the air-fuel ratio correction coefficient α3) in accordance with the air-fuel ratio correction amount and the cycle correction amount. Means E is provided to supply a fuel into the engine. Additionally, means F is provided to control an amount of the fuel to be supplied from the fuel supply means, in accordance with the fuel supply amount.

As appreciated from the above, according to the embodiment, the single oxygen sensor 4 is disposed downstream of the catalytic converter 3, and therefore the air-fuel ratio control system is simplified in construction and control and reduced in production cost while suppressing the thermal deterioration of the oxygen sensor 4 thereby maintaining high the exhaust gas purifying ability of the catalytic converter.

According to location of the oxygen sensor 4 on the downstream side of the catalytic converter 3, oxygen in exhaust gas is consumed in conversion in the catalytic converter 3 thereby largely reducing the amount of oxygen reaching the oxygen sensor 4. As a result, the cycle of a feedback control of the air-fuel ratio is prolonged so that the air-fuel ratio of the mixture to be supplied to the engine is difficult to be maintained around the stoichiometric value, thereby largely degrading the convention efficiency of the catalytic converter 3.

In view of this, according to the above-discussed embodiment, the control constant α1 obtained according to the air-fuel ratio detected under the action of the oxygen sensor 4 is compulsorily minutely vibrated under the action of the cycle signal α2 by virtue of the air-fuel ratio correction coefficient α3 as shown in FIG. 3 so that the air-fuel ratio feedback control cycle is shortened. Accordingly, the air-fuel ratio of the mixture can be maintained around the stoichiometric value, thus improving the conversion efficiency of the catalytic converter.

What is claimed is:

1. An air-fuel ratio control system for an internal combustion engine having a catalytic converter disposed in an exhaust gas passageway of the engine, said system comprising:

means for detecting an air-fuel ratio of an air-fuel mixture supplied to the engine, by sensing a component of exhaust gas in the exhaust gas passageway downstream of the catalytic converter, said air-fuel ratio detecting means including no more than a single air-fuel ratio sensor, wherein said single air-fuel ratio sensor is disposed in the exhaust gas passageway downstream of the catalytic converter to detect an air-fuel ratio in the exhaust passageway downstream of the catalytic converter;

means for setting an air-fuel ratio correction amount in accordance with said detected air-fuel ratio, to control said air-fuel ratio toward a target air-fuel ratio, said air-fuel ratio correction amount having a period and an amplitude in variation;

means for setting a cycle correction amount in accordance with an engine operating condition, at least one of said period and said amplitude of said air-fuel ratio correction amount being changeable in accordance with said cycle correction amount, said cycle correction amount being set such that said amplitude of said air-fuel ratio correction amount is large at a low engine coolant temperature as compared with that at a high engine coolant temperature higher than said low engine coolant temperature;

means for setting a fuel supply amount in accordance with said air-fuel ratio correction amount and said cycle correction amount;

means for supplying a fuel into the engine; and means for controlling an amount of the fuel to be supplied from said fuel supply means, in accordance with said fuel supply amount.

2. An air-fuel ratio control system as claimed in claim 1, wherein said cycle correction amount is set such that said period of said air-fuel ratio correction amount is changeable in accordance with the engine operating condition, wherein said period decreases as an engine load increases.

3. An air-fuel control system as claimed in claim 1, wherein said cycle correction amount is set such that said period of said air-fuel ratio correction amount is changeable in accordance with an amount of intake air, wherein said period decreases as an amount of intake air increases.

4. An air-fuel control system as claimed in claim 1, wherein said cycle correction amount is set such that a time width (TL1) of each wave in variation and said period (TL2) of said air-fuel ratio correction amount are in a relationship of TL1=TL2/2=t1/Qa where t1 is a constant value; and Qa is an amount of intake air.

5. An air-fuel control system as claimed in claim 1, wherein said cycle correction amount is set such that said amplitude of said air-fuel ratio correction decreases as an engine speed increases.

6. An air-fuel control system as claimed in claim 1, wherein said cycle correction amount is set such that said amplitude of said air-fuel ratio correction amount increases as an engine load increases.

7. An air-fuel control system as claimed in claim 1, wherein said cycle correction amount is set such that said amplitude of said air-fuel ratio correction amount is constant regardless of an engine speed at a low engine load lower than a predetermined value, and decreases as the engine speed increases at an engine load higher than the predetermined value.

8. An air-fuel ratio control system as claimed in claim 1, wherein said air-fuel ratio sensor is an oxygen sensor disposed in the exhaust gas passageway downstream of the catalytic converter, said oxygen sensor being adapted to detect the concentration of oxygen in the exhaust gas.

9. An air-fuel control system as claimed in claim 1, wherein the catalytic converter is a three-way catalytic converter.

10. An air-fuel ratio control system as claimed in claim 1, wherein said air-fuel ratio correction amount setting means includes means for controlling said air-fuel ratio toward a stoichiometric air-fuel ratio.

11. An air-fuel control system as claimed in claim 8, wherein said air-fuel ratio setting means includes means for setting a control constant in accordance with an output of said oxygen concentration, said control constant being changeable with time.

12. An air-fuel control system as claimed in claim 11, wherein said cycle correction amount setting means includes means for outputting a cycle correction pulse signal having a predetermined pulse interval, and means for outputting a signal representative of a constant corresponding to said amplitude, said constant being determined in accordance with an engine operating condition.

13. An air-fuel control system as claimed in claim 12, wherein said fuel supply amount setting means includes means for setting an air-fuel ratio correction coefficient in accordance with said control constant and at least one of said predetermined pulse interval and pulse width, said fuel supply amount being set in accordance with said air-fuel ratio correction coefficient.

14. An air-fuel ratio control system as claimed in claim 13, wherein said fuel supply amount setting means includes means for changing said air-fuel ratio correction coefficient in accordance with at least one of said predetermined pulse interval and pulse width of said cycle correction pulse signal.

15. An air-fuel ratio control system for an internal combustion engine having a catalytic converter disposed in an exhaust gas passageway of the engine, said system comprising:

means for detecting an air-fuel ratio of an air-fuel mixture supplied to the engine, by sensing a component of exhaust gas in the exhaust gas passageway downstream of the catalytic converter, said air-fuel ratio detecting means including no more than a single air-fuel ratio sensor, wherein said single air-fuel ratio sensor is disposed in the exhaust gas passageway downstream of the catalytic converter to detect an air-fuel ratio in the exhaust passageway downstream of the catalytic converter;

means for setting an air-fuel ratio correction amount in accordance with said detected air-fuel ratio, to control said air-fuel ratio toward a target air-fuel ratio, said air-fuel ratio correction amount having a period and an amplitude in variation;

means for setting a cycle correction amount in accordance with an engine operating condition, at least one of said period and said amplitude of said air-fuel ratio correction amount being changeable in accordance with said cycle correction amount, said cycle correction amount being set such that said amplitude of said air-fuel ratio correction amount is constant regardless of an engine speed at a low engine load lower than a predetermined value, and decreases as the engine speed increases at an engine load higher than the predetermined value;

means for setting a fuel supply amount in accordance with said air-fuel ratio correction amount and said cycle correction amount;

means for supplying a fuel into the engine; and means for controlling an amount of the fuel to be supplied from said fuel supply means, in accordance with said fuel supply amount.

16. An air-fuel ratio control system for an internal combustion engine having a catalytic converter disposed in an exhaust gas passageway of the engine, said system comprising:

means for detecting an air-fuel ratio of an air-fuel mixture supplied to the engine, by sensing a component of exhaust gas in the exhaust gas passageway downstream of the catalytic converter, said air-fuel ratio detecting means including no more than a single air-fuel ratio sensor, wherein said single air-fuel ratio sensor is disposed in the exhaust gas passageway downstream of the catalytic converter to detect an air-fuel ratio in the exhaust passageway downstream of the catalytic converter;

means for setting an air-fuel ratio correction amount in accordance with said detected air-fuel ratio, to control said air-fuel ratio toward a target air-fuel ratio, said air-fuel ratio correction amount having a period and an amplitude in variation;

means for setting a cycle correction amount in accordance with an engine operating condition, at least one of said period and said amplitude of said air-fuel ratio correction amount being changeable in accordance with said cycle correction amount, said cycle correction amount is set such that (a) said amplitude of said air-fuel ratio correction amount is large at a low engine coolant temperature as compared with that at a high engine coolant temperature higher than said low engine coolant temperature, and (b) said amplitude of said air-fuel ratio correction amount is constant regardless of an engine speed at a low engine load lower than a predetermined value, and decreases as the engine speed increases at an engine load higher than the predetermined value;

means for setting a fuel supply amount in accordance with said air-fuel ratio correction amount and said cycle correction amount;

means for supplying a fuel into the engine; and means for controlling an amount of the fuel to be supplied from said fuel supply means, in accordance with said fuel supply amount.

\* \* \* \* \*